United States Patent [19]

Nagata

[11] Patent Number: 5,281,987
[45] Date of Patent: Jan. 25, 1994

[54] CAMERA HAVING A MAGNETIC HEAD AND CAPABLE OF DETECTING EXPOSED FRAMES BY COUNTING DATA ITEMS IN A MAGNETIC RECORDING TRACK

[75] Inventor: Toru Nagata, Tokyo, Japan

[73] Assignee: Canon Kabushiki Kaisha, Tokyo, Japan

[21] Appl. No.: 786,884

[22] Filed: Nov. 1, 1991

[30] Foreign Application Priority Data

Nov. 2, 1990 [JP] Japan .................. 2-297828

[51] Int. Cl.⁵ .......................................... G03B 17/24
[52] U.S. Cl. ................................................ 354/105
[58] Field of Search ............................. 354/105, 106

[56] References Cited

U.S. PATENT DOCUMENTS 4,864,332  9/1989  Harvey ..................... 354/105 X
4,878,075 10/1989  Cannon ..................... 354/106 X
5,006,873  4/1991  Wash ........................ 354/106

FOREIGN PATENT DOCUMENTS 0362892 4/1990 European Pat. Off. .
WO9004204 4/1990 PCT Int'l Appl. .

Primary Examiner—M. L. Gellner
Assistant Examiner—J. K. Han
Attorney, Agent, or Firm—Fitzpatrick, Cella, Harper & Scinto

[57] ABSTRACT

A camera with a processing device for reading information recorded on an information recording medium corresponding to each frame of film, and for writing information into the information recording medium, includes a control circuit for substantially erasing a subset of a plurality of data items pre-recorded on the recording medium for each frame, by writing information on the recording medium for each frame with the processing device, and a judgment circuit for (i) counting a number of non-erased data items on the recording medium for each frame, (ii) comparing the counted number with a threshold value, the threshold value being less than a number of the plurality of pre-recorded data items, and (iii) judging that the writing of information has not been performed by the processing means when the counted number is greater than or equal to the threshold value.

17 Claims, 11 Drawing Sheets

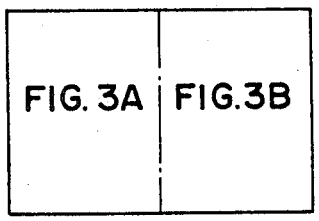
FIG. 3A
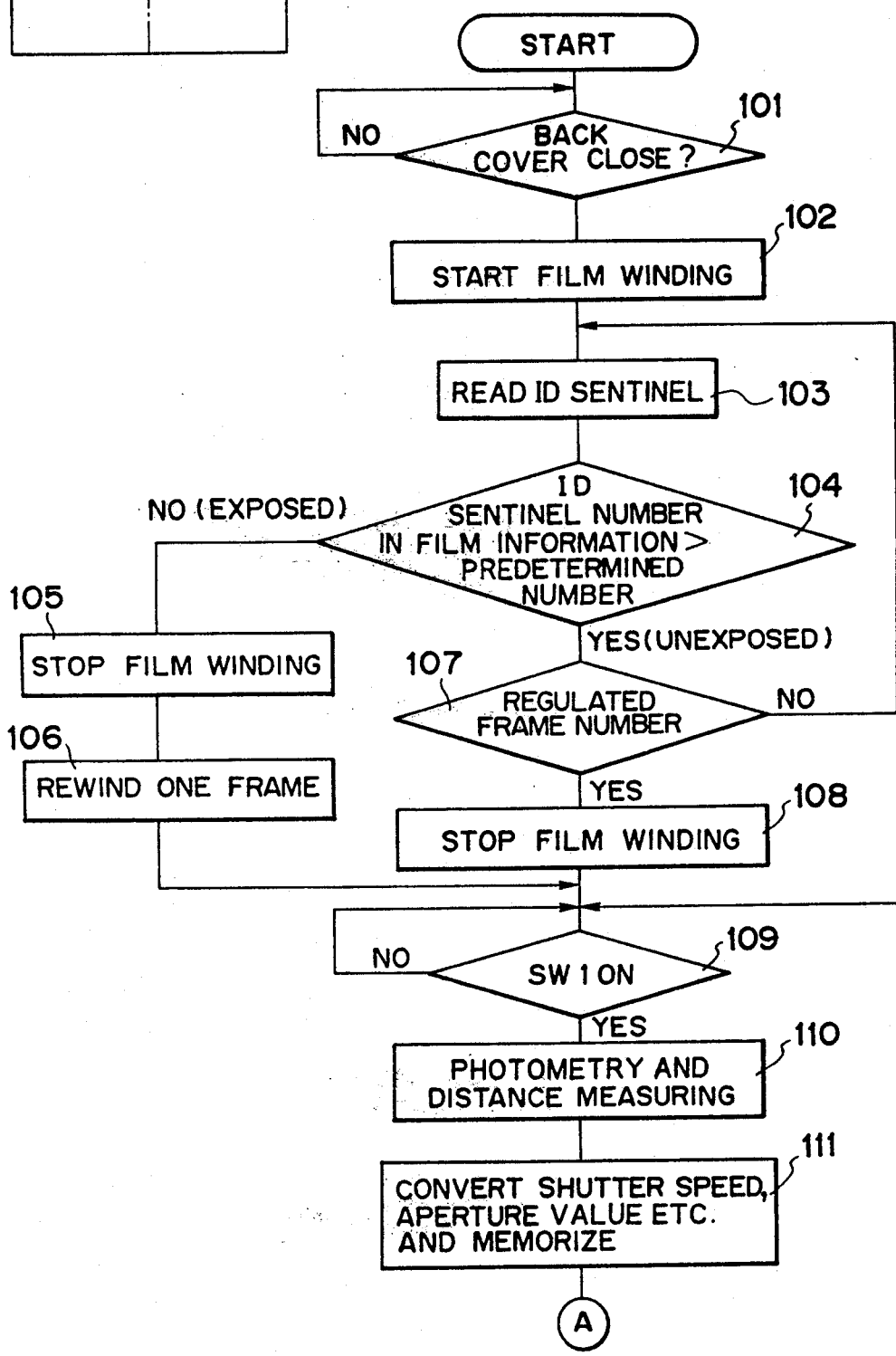

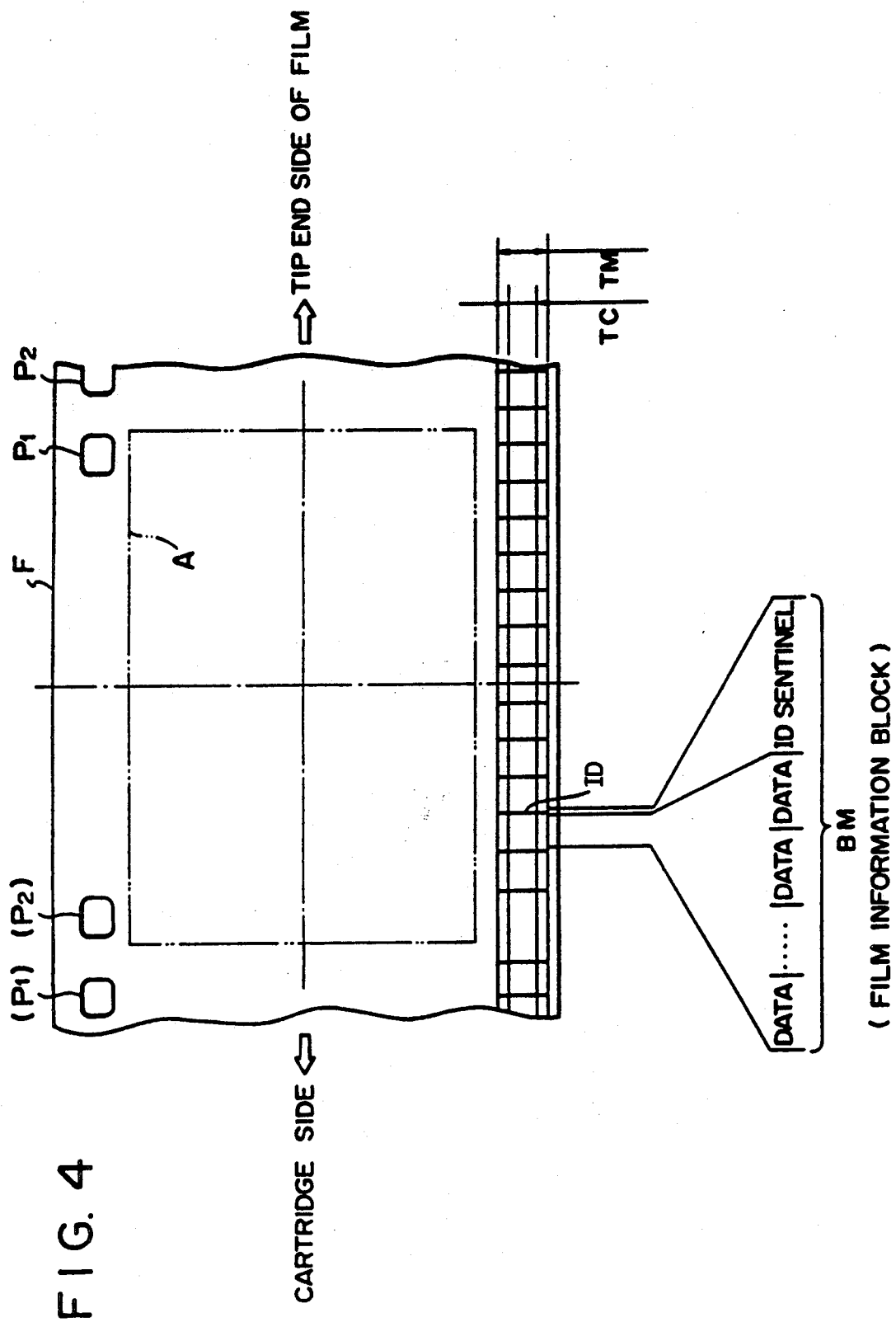

(UNEXPOSED FRAME)

(EXPOSED FRAME WITH CAMERA INFORMATION $C_{MAX}$)

(EXPOSED FRAME WITH CAMERA INFORMATION $C_{MIN}$)

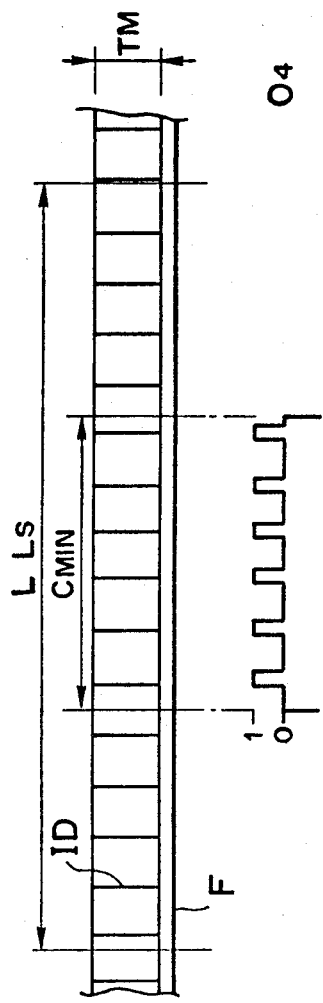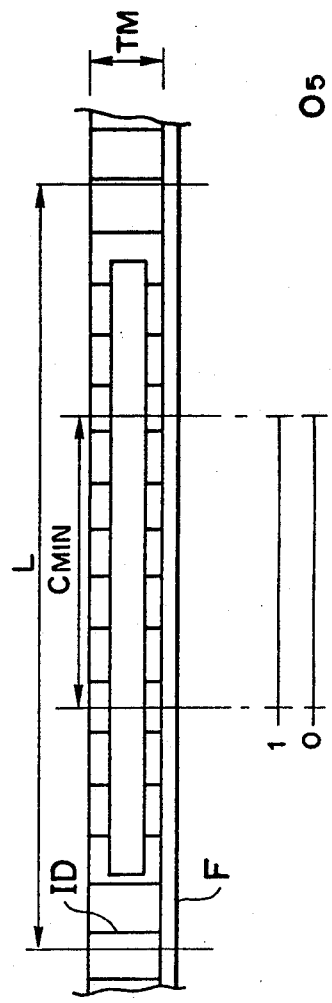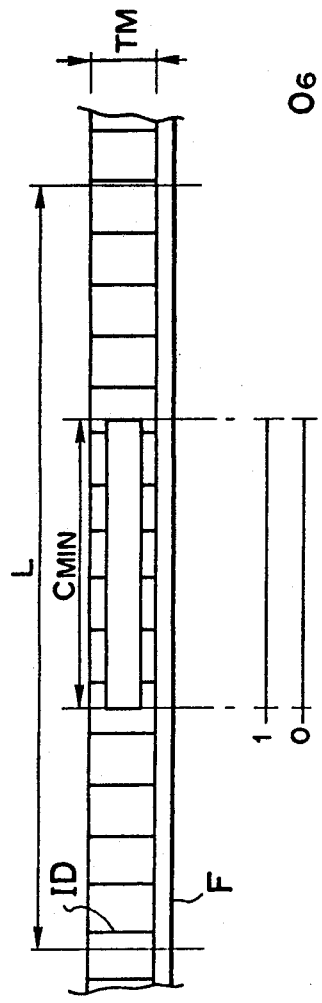
FIG. 10A (UNEXPOSED FRAME)
FIG. 10B (EXPOSED FRAME WITH CAMERA INFORMATION $C_{MAX}$)
FIG. 10C (EXPOSED FRAME WITH CAMERA INFORMATION $C_{MIN}$)

CAMERA HAVING A MAGNETIC HEAD AND CAPABLE OF DETECTING EXPOSED FRAMES BY COUNTING DATA ITEMS IN A MAGNETIC RECORDING TRACK

BACKGROUND OF THE INVENTION

1. Field of the Invention

This invention relates to a camera using film with a magnetic memorizing portion and provided with writing instruction means for driving a magnetic head during the feeding of the film by film feeding means after the termination of photographing, and causing camera information to be overwritten on film information pre-written in the magnetic memorizing portion of an exposed frame.

2. Description of the Related Art

A camera using a film cartridge containing the leading end portion of film therein and rewinding film that has not been completely exposed (halfway removal) and the reloading and use of the film cartridge is disclosed in U.S. Pat. No. 4,878,075.

In this patent, there are disclosed the technical substance that the film is provided with a magnetic memorizing portion comprising a transparent magnetic layer, that the camera has a magnetic head for writing information into the magnetic memorizing portion or reading out information pre-recorded in the magnetic memorizing portion, and that in order to discriminate between exposed and unexposed frames when the film in the cartridge has been rewound without completely exposing all of the film frames is again reloaded, 1) particular information is recorded on an exposed frame and this is used as an exposed flag (hereinafter referred to as DEP flag (Double Exposure Prevention encodement)) and whether there is this DEP flag during reloading is read out by the magnetic head, and a frame having this DEP flag is judged to be an "exposed" frame, and 2) film information is pre-recorded on the film and the camera makes or generates the DEP flag by overwriting particular information on an exposed frame or simply erasing the film information, and whether the DEP flag 1 is present during reloading is read out by the magnetic head, and a frame having this DEP flag is judged to be an "exposed" frame.

In the above-mentioned patent, there is further disclosed the sequence of film winding→exposed frame detection→unexposed frame positioning during reloading.

Further, in W090/04204, film information pre-recorded on film by a film maker and camera information recorded on each frame by a camera are prescribed as being comprised of an information block called "N bits of ID sentinels+data characters", and different ID sentinels are prescribed for the purpose of distinguishing between the camera information and the film information and the purpose of detecting a start sentinel. Also, it is disclosed that the ID sentinel of the camera information differing from the film information is used as DEP flag.

However, both of the above-described examples of the related art are designed such that "exposed" frames are discriminated by the presence of DEP flag, and this has led to the following serious problems:

1) Since there is only a single DEP flag in each photographing frame, a very low reproduction error rate is required in order to detect this DEP flag; and 2) When one fails in detecting the DEP flag, due to a reproduction error, an "exposed" frame is discriminated as unexposed, and double exposure takes place.

SUMMARY OF THE INVENTION

One aspect of the application is to provide a camera using film with a magnetic memorizing portion which can discriminate between an exposed frame and an unexposed frame by a system differing from that of the related art.

One aspect of the application is to provide a camera using film with a magnetic memorizing portion which can prevent double exposure.

One aspect of the application is to provide a camera using film with a magnetic memorizing portion which can alleviate the error rate of the required reading-out of film information by a magnetic head.

One aspect of the application is to provide a camera in which a plurality of bits of particular information (ID sentinels) are pre-recorded on the magnetic track portion of each frame of film and a predetermined number of bits of the particular information are erased during information recording in each photographing cycle, whereby the judgment of an exposed or unexposed frame is done by the number of bits of the particular information in each frame.

One aspect of the application is to provide, under the above object, a camera in which when a film up to halfway exposed it is rewound and then again received into the camera, the film is fed until an unexposed frame is judged by the judgment operation.

Other objects of the present invention will become apparent from the following detailed description of some embodiments of the invention taken in conjunction with the accompanying drawings.

BRIEF DESCRIPTION OF THE DRAWINGS

FIG. 4 shows the arrangement of a film information track and a camera information track on the film shown in FIG. 1 and the construction of a film information block in the film information track as seen from the base surface of the film.

FIGS. 10A-10C illustrate a system for discriminating between exposed and unexposed frames by the ID number detection of film information in the second embodiment of the present invention.

DESCRIPTION OF THE PREFERRED EMBODIMENTS

FIGS. 1 to 7C show a first embodiment of the present invention.

Figure 1:
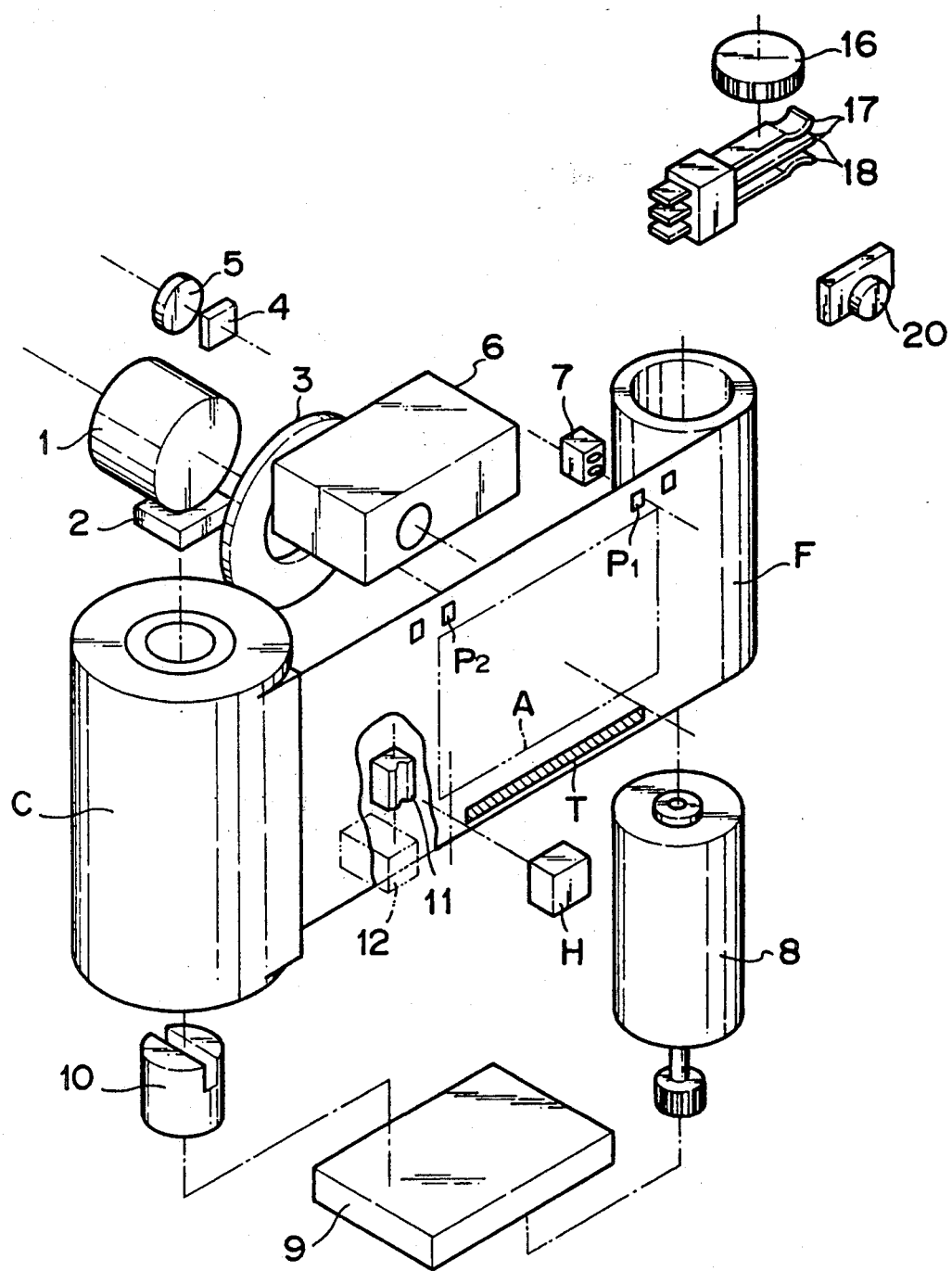
FIG. 1 is a perspective view showing the mechanical construction of a camera according to a first embodiment of the present invention.

Referring to FIG. 1 which is a perspective view showing the construction of portions of the camera, the reference numeral 1 designates a photo-taking lens, the reference numeral 2 denotes a lens actuator for driving the photo-taking lens 1 and a lens encoder producing a lens position signal, the reference numeral 3 designates a lens shutter, the reference numeral 4 denotes a photometry sensor for AE, the reference numeral 5 designates a lens for determining the light receiving angle of the photometry sensor 4, the reference numeral 6 denotes a block including a distance measuring sensor and a finder, the reference numeral 7 designates a photoreflector for detecting the perforations $P_1$ and $P_2$ of film F and producing a signal for effecting, or performing, one-frame indexing of the film F, the reference numeral 8 denotes a film feeding motor disposed in a spool, the reference numeral 9 designates a gear train for effecting, or performing, deceleration and the changeover of winding and rewinding, and the reference numeral 10 denotes a rewinding fork.

The letter C designates a film cartridge containing therein the film with the leading end thereof exposed, the letter F denotes the aforementioned film provided with a magnetic memorizing portion (a magnetic track T) on the base side $P_1$ and $P_2$ designate the aforementioned perforations corresponding to the imaging area A, and the letter H denotes a magnetic head for writing information on the magnetic track T on the film F or reading out information therefrom. The reference numeral 11 designates a pad for urging the film F against the magnetic head H. The pad 11 has in the central portion thereof a recess for enhancing the intimate contact between the film F and the head gap. The reference numeral 12 denotes a pad serving as a forward and backward movement control mechanism for urging the pad 11 against the magnetic head H with the film F interposed therebetween only during the feeding of the film, the reference numeral 16 designates a release button, the reference numeral 17 denotes a switch (SW1) for starting photometry and distance measurement, the reference numeral 18 designates a switch (SW2) for starting the opening of a shutter and the sequence of film feeding, and the reference numeral 20 denotes a rewinding switch for effecting halfway rewinding.

Figure 2:
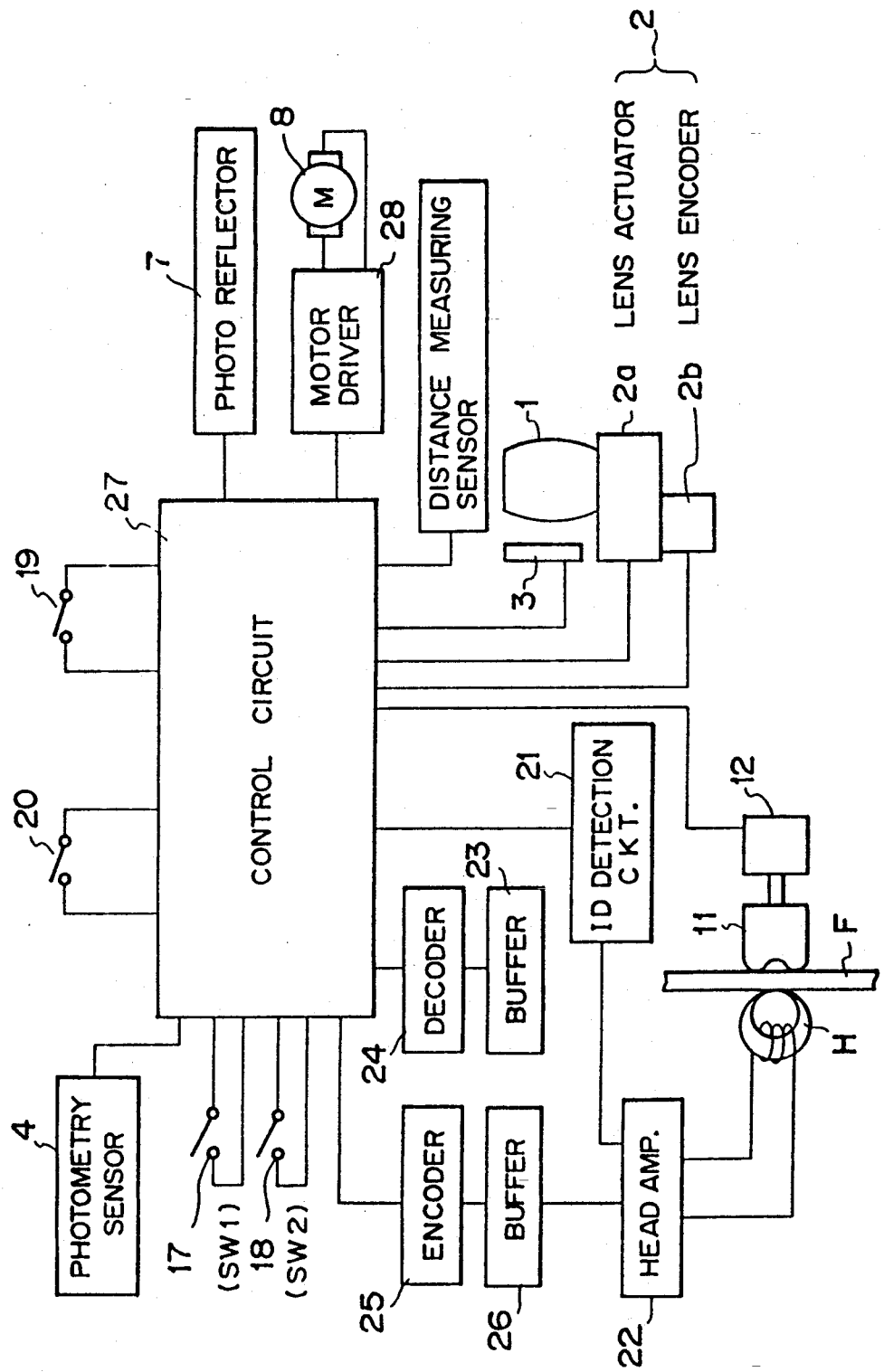
FIG. 2 is a circuit block diagram of the camera shown in FIG. 1.

FIG. 2 is a circuit block diagram of the portions of the camera according to the present invention, and in FIG. 2, the same portions as those in FIG. 1 are given the same reference numerals.

In FIG. 2, the reference numeral 19 designates a back cover switch for detecting the closing of a back cover, the reference numeral 21 denotes an ID detection circuit for detecting ID sentinels in film information, the reference numeral 22 designates a head amplifier for the magnetic head H, the reference numeral 23 denotes a buffer, the reference numeral 24 designates a decoder, the reference numeral 25 denotes an encoder, the reference numeral 26 designates a buffer, the reference numeral 27 denotes a control circuit comprised of a microcomputer or the like for effecting the sequence control of each circuit, and the reference numeral 28 designates a motor driver for driving the film feeding motor 8.

The operation of the control circuit 27 will now be described with reference to the flowchart of FIG. 3. The camera of the present embodiment is supposed to be of the so-called prewind type in which film F is first all the way wound up and the rewinding of the film is effected for each one-frame photographing cycle.

Description will first be made of the operation when the camera is loaded with an entirely unused, or unexposed film cartridge.

When the camera is loaded with a film cartridge C and the back cover thereof is closed and the back cover switch 19 is closed, advance is made from a step 101 to a step 102, where the film feeding motor 8 is driven through the motor driver 28 to start the winding of all of the film F. Then at a step 103, in the course of this film winding, film information such as film speed, the prescribed number of frames and the kind of the film recorded, as a row of data characters beginning with an ID sentinel (an information start signal) on the magnetic track T of the film F, is read out by the magnetic head H.

This read-out film information is amplified by the head amplifier 22, is A/D-converted, and thereafter is transferred to the buffer 23, and then is decoded by the decoder 24 and is transferred to the control circuit 27.

Also, at this step 103, the ID detection circuit 21 continues to detect code data, for example, N bits of ID sentinel of the film information (e.g. "10000000"), and the control circuit 27 receives this detection output as an input and counts the number of ID sentinels. At the next step 104, the number of ID sentinels in the film information is compared with a predetermined number which is a threshold value indicative of whether the frame is an "exposed" frame, and if the frame is discriminated as an "exposed" frame (the number of ID sentinels ≦ the predetermined number), advance is made to a step 105 (which is important when the camera is reloaded with the halfway rewound film, and will be described later in detail), and if the frame is not an "exposed" frame (the number of ID sentinels > the predetermined number), advance is made to a step 107.

Since as described above, the case where the camera is loaded with the unused film cartridge C is supposed here, advance is made from the step 104 to the step 107. At this step 107, the number of fed frames is counted from the output of the photo-reflector 7 and whether the number has reached the previously read prescribed number of frames is discriminated, and if so discriminated, advance is made to a step 108, where the driving of the film feeding motor 8 is prohibited to stop the winding of the film.

At a step 109, whether the switch SW1 is ON is discriminated, and if this switch is judged to be ON, advance is made to a step 110, where the operations of photometry and distance measurement are performed. At the next step 111, the shutter time, or speed the aperture value, etc. obtained by the operations of photometry and distance measurement are converted into camera information, which is transferred to the encoder 25.

The encoder 25 encodes the camera information transferred thereto, and the buffer 26 accumulates it therein.

At the next step 112, whether the switch SW2 is ON is discriminated, and if the switch SW2 is judged to be ON, advance is made to a step 113, where the conventional exposure operation is performed.

That is, the control circuit 27 receives a lens position signal as an input from the lens encoder 2b through the lens actuator 2a, and sends a stop command to the lens actuator 2a by the photo-taking lens 1 coming to a position corresponding to the measured distance information obtained at the step 110, thus stopping the driving of the photo-taking lens 1, i.e., the focusing operation. Substantially simultaneously therewith, the opening-closing operation of the shutter 3 is performed for a time determined by the output of the photometry sensor 4 at the step 110.

At a step 114, the motor 8 is operated to start the rewinding of an exposed frame (one-frame rewinding). It is to be understood that at this time, the gear train 9 is changed over to the rewinding side. At a step 115, the magnetic head H is driven, whereby the camera information accumulated in the buffer 26 through the head amplifier 22 in the middle of this film rewinding is written onto the magnetic track T of the film F in the form of a row of data characters beginning with N bits of ID sentinel (e.g. "00000000") differing from the ID sentinel of the film information. At a step 116, whether the rewinding of the exposed frame has been completed is judged from the output of the photoreflector, and if it is judged that this rewinding of the exposed frame has been completed, advance is made to a step 117, where whether there are any unexposed frames in the film F (whether there are any remaining frames) is discriminated, and if the answer is YES, advance is made to a step 118. At the step 118, whether halfway rewinding is instructed is judged from the state of the rewind switch 20, and if halfway rewinding is not instructed, the motor 8 is stopped and return is made to the step 109 to prepare for the next photographing operation.

If at the step 117, it is judged that there is no remaining frame in the film F or, if at the step 118, it is judged that halfway rewinding has been done, advance is made to a step 119, where the rewinding of the film F is continued until a continuous output is no longer input from the photo-reflector 7, that is, until the leading end of the film passes the position of the photo-reflector 7. As the result, there is brought about a state in which only the leading end of the film is not wound into the film cartridge C. If this film cartridge is of a type in which the leading end of the film can be forced out of the cartridge by the rotation of the fork 10, the rewinding of the film may be continued until even the leading end of the film is received into the cartridge.

Thus, a series of operations when the camera is loaded with the unused film cartridge C are completed.

Although not described above, the pad 11 is urged against the magnetic head H by the pad serving as a forward and backward movement control mechanism 12 only during the movement of the film F so as to ensure the reading-out or writing of magnetic information to may be accomplished reliably.

Description will now be made of the operation when at the step 118, the camera is again loaded with the film cartridge subjected to rewinding without having been completely exposed (halfway removal) (the film cartridge containing therein the film has been used up to halfway).

When the camera is loaded with the film cartridge subjected to halfway rewinding upon closing of the rewind switch 20 and the back lid is closed and the back lid switch 19 is closed, the operation proceeds from the step 101 to the step 102 as when the camera is loaded with an unused film cartridge C, and the winding of the film F is started. Similarly at the step 103, in the course of this film winding, the film information such as the film speed, the prescribed number of frames and the kind of the film recorded as a row of data characters beginning with an ID sentinel on the magnetic track T of the film F is read out by the magnetic head H and the number of ID sentinels of the film information detected by the ID detection circuit 21 is input for each frame and counted. At the next step 104, the number of ID sentinels of the film information and a predetermined number which is a threshold value indicative of whether the frame is an "exposed" frame are compared with each other for each frame, and by detecting a frame for which "the number of ID sentinels $\leq$ the predetermined number", it is judged that the frame is an "exposed" frame (this method of judgment will be described later), and advance is made to the step 105, where the driving of the film feeding motor 8 is prohibited to thereby stop the winding of the film immediately. At the next step 106, the film feeding motor 8 is driven in the opposite direction to thereby effect one-frame rewinding. Thus, an unexposed frame is positioned at the aperture position in the camera.

Here, the judgment at the step 104 will be described in detail. The control circuit 27 counts the number of the ID sentinels of the film information pre-recorded on each frame. If at this time, a certain frame is an "unexposed" frame, all the ID sentinels in one frame are detected by the magnetic head H (if for example, there are fifteen ID sentinels in one frame, all the fifteen ID sentinels are detected), but if the frame is an "exposed" frame, at least a portion of the ID sentinels have been rewritten as camera information and thus, the number of the ID sentinels of the film information which are detectable decreases (e.g. nine). Accordingly, when the number of the ID sentinels counted is greater than a predetermined number (e.g. nine), the control circuit 27 judges that that frame is "unexposed", and advance is made from the step 104 to the step 107, but when the number of the ID sentinels counted is equal to or less than the predetermined number such as nine, the control circuit judges that that frame is an "exposed" frame, and advance is made from the step 104 to the step 105, where the film winding and the perforation detection (which, although not described above, is input to effect the indexing of the frame) are immediately stopped, and at the next step 106, one-frame rewinding is effected and the positioning of the frame is effected, and the camera becomes ready to photograph.

The details of the film information and the camera information will now be described with reference to FIGS. 4 to 6.

FIG. 4 shows the arrangement of a film information track TM and a camera information track TC on the film F and the construction of a film information block BM in the film information track as they are seen from the base surface of the film.

The film information track TM and the camera information track TC are disposed along the film F, and the camera information track TC is formed in the film information track TM.

The camera information track TC is at the head gap position of the magnetic head H of the camera, and design is made such that even if during recording and reproduction, the film F more or less moves up and down, the head gap is always within the film information track TM.

The film information track TM, as shown, comprises a continuity of the film information block BM, and particularly the portions of the ID sentinels are indicated by vertical lines. In this example, design is made such that as described above, fifteen ID sentinels of the film information are included in one pitch (one frame of perforations $P_1$ and $P_2$).

In this embodiment, the film is of the pre-wind construction, and as will be described later, the direction of the film information and the direction of the camera information are opposite to each other. Therefore, it is necessary that the ID sentinels of the film information have a bit order differing from all film information characters and the bit row formed by the arrangement thereof and further, the ID sentinels and data characters of the camera information when the film is reversed and reproduced and the bit row formed by them.

Figure 5:
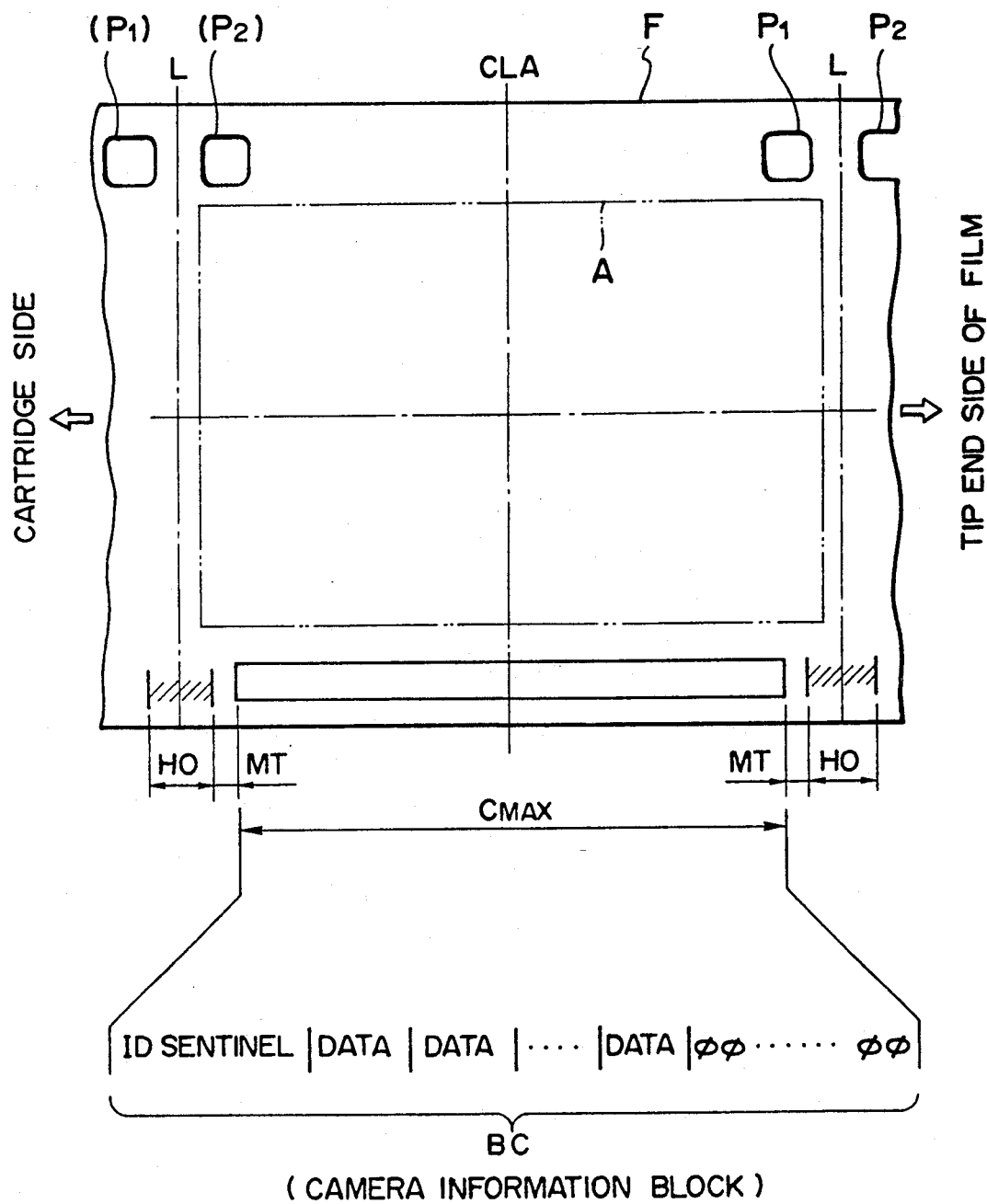
FIGS. 5 and 6 show the maximum or minimum length on the film shown in FIG. 1 on which camera information can be written as seen from the base surface of the film.
Figure 6:
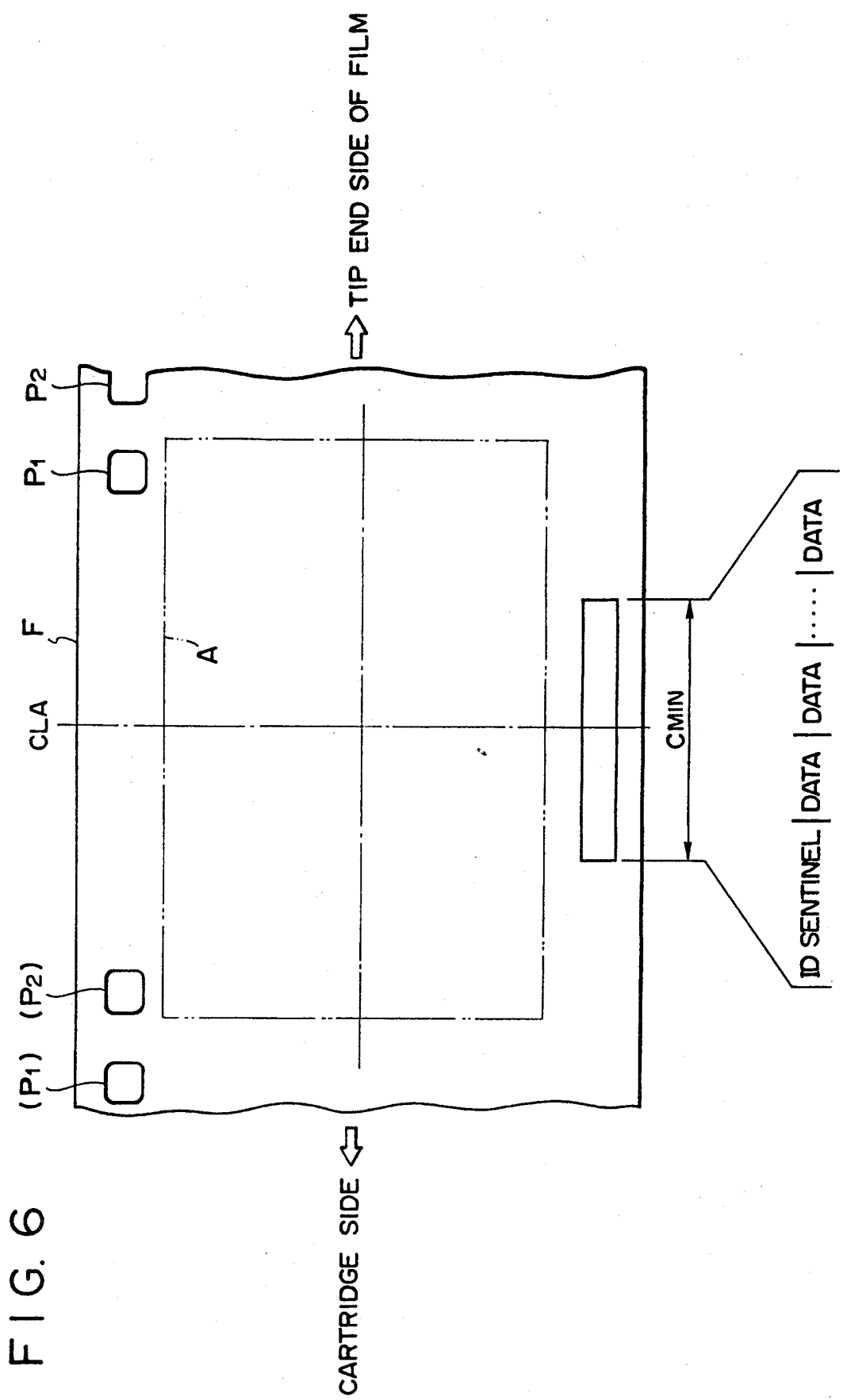

FIGS. 5 and 6 show the length of the camera information track TC on the film F, and are views as the film is seen from the base surface thereof, like FIG. 4.

In FIG. 5, the letter L designates the boundary between photographing frames (exposed frames) which is the reference position of the head gap of the magnetic head H. HO is the degree of freedom of the opposite sides of the head position (the head offset), and MT is the irregularity of the frame feed positioning. Accordingly, the maximum length CMAX over which the camera information TC can be written is given by $$\begin{aligned}CMAX &= L - (HO + 2MT) \\ &= \text{full length of one frame} - (\text{degree of} \\ &\quad \text{freedom of the head} + \text{frame feed} \\ &\quad \text{tolerance}).\end{aligned}$$

The structure of each camera information block BC is such that it begins with N bits of ID sentinels differing from the film information TM in the opposite direction, followed by characters, and after the termination of the data, the block BC is filled with a binary "0". The maximum length CMAX over which the camera information TC can be written is an area except which any camera must not write. By this prescription, overlapping of bits of information written is prevented in cameras not exceeding the head offset HO. It is desirable that the maximum length CMAX over which the camera information TC can be written be symmetrical with respect to the center CLA of the image area.

In FIG. 6, CMIN is the minimum length over which the camera information block BC can be written, and may be the necessary minimum as shown, or may be adjusted by "0" as shown in FIG. 5 from the other conditions. Also, the minimum length CMIN over which the camera information block BC can be written is an area in which every camera must write. It is desirable that the minimum length CMIN over which the camera information block BC can be written be also symmetrical with respect to the center CLA of the image area.

The method of detecting the ID sentinels of the film information TM and discriminating between exposed and unexposed frames will now be described with reference to FIGS. 7A to 7C.

Figure 7A:
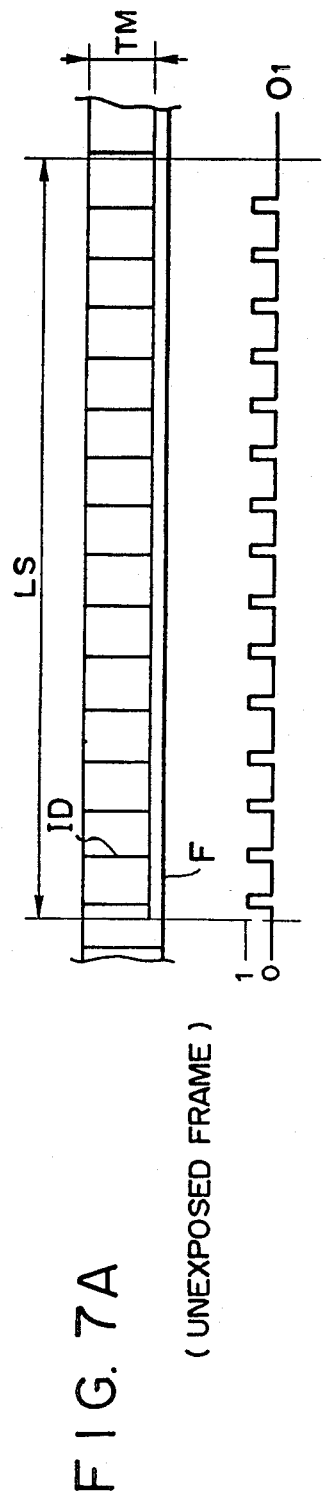
FIGS. 7A-7C illustrate a system for discriminating between exposed and unexposed frames by the ID number detection of film information in the first embodiment of the present invention.
Figure 7B:
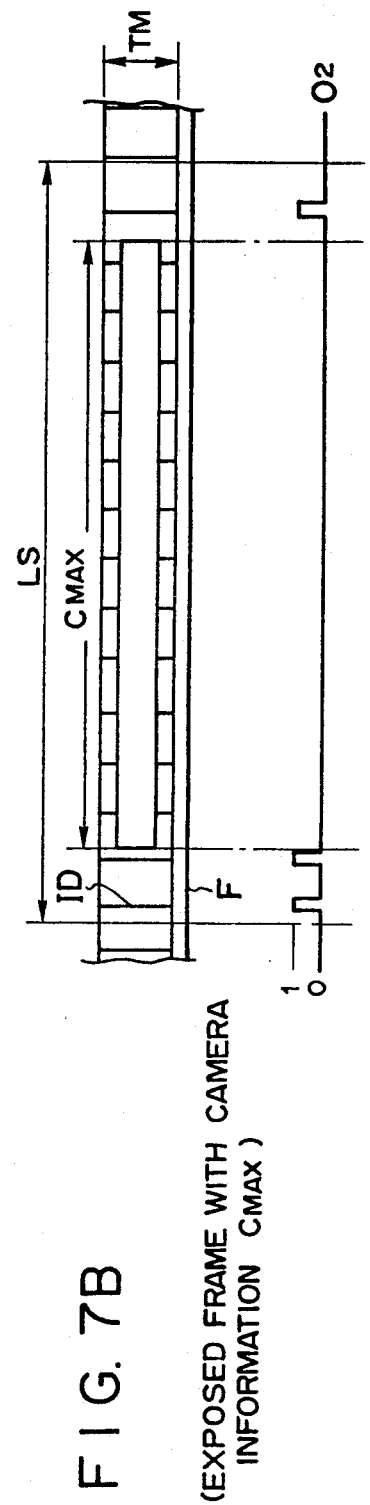
Figure 7C:
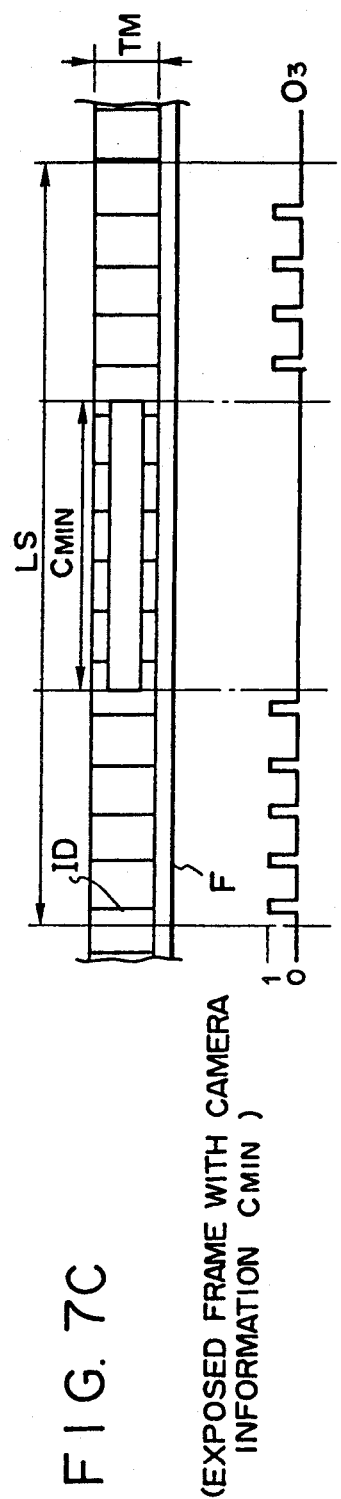

In FIGS. 7A to 7C, LS designates the scan area of the magnetic head H in one frame, and the difference between head positions depending on cameras may be regarded as the same as the full length of one frame because if it is equal to or less than the offset HO, there is no overlap of bits of written information.

FIG. 7A shows an unexposed frame and $O_1$ indicates the output of the ID detection circuit 21 in this case, FIG. 7B shows an exposed frame having the camera information TC written over the maximum length CMAX, and $O_2$ indicates the output of the ID detection circuit 21 in this case, and FIG. 7C shows an exposed frame having the camera information TC written over the minimum length CMIN, and $O_3$ indicates the output of the ID detection circuit 21 in this case.

From the output $O_3$ of the ID detection circuit 21, it is seen that the maximum number of ID sentinels (hereinafter referred to as the ID number) in an "exposed" frame is 9. Accordingly, discrimination can be made as follows:

| ID number | 0–9 | "exposed" frame |
|---|---|---|
| ID number | 10–15 | "unexposed" frame |

When a reproduction error occurs, the ID number detected decreases, but if ten of fifteen ID sentinels in an "unexposed" frame can be detected, right discrimination can be made. This means that even if the reproduction error rate is high, the probability with which a correct discrimination may be made is much higher than in the related art. Further, in an "exposed frame", this decrease poses no problem.

FIGS. 8 to 10C show a second embodiment of the present invention. This embodiment is entirely equal to the first embodiment in the operation when an unused film cartridge is used.

Figure 8:
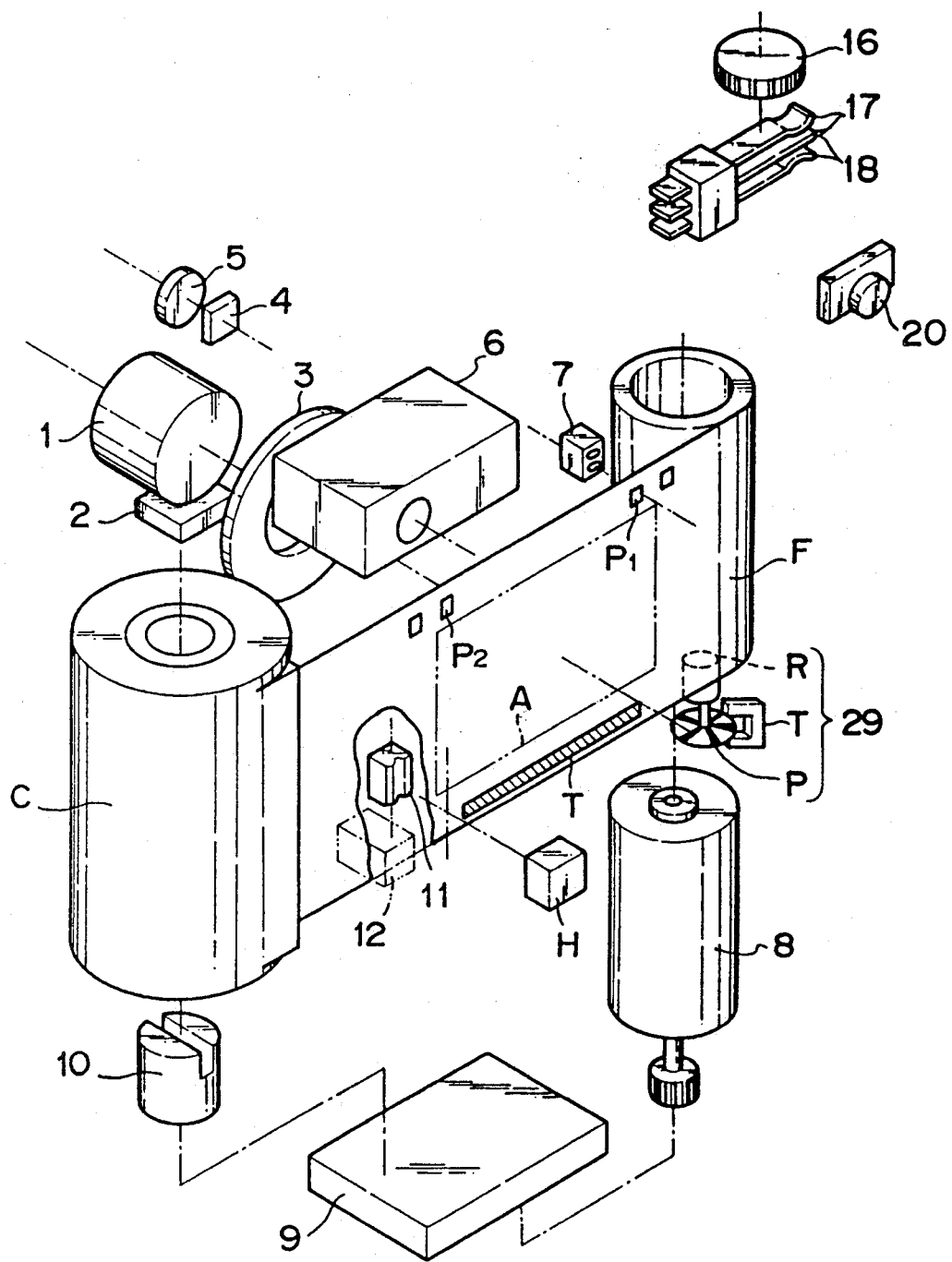
FIG. 8 is a perspective view showing the mechanical construction of a camera according to a second embodiment of the present invention.
Figure 9:
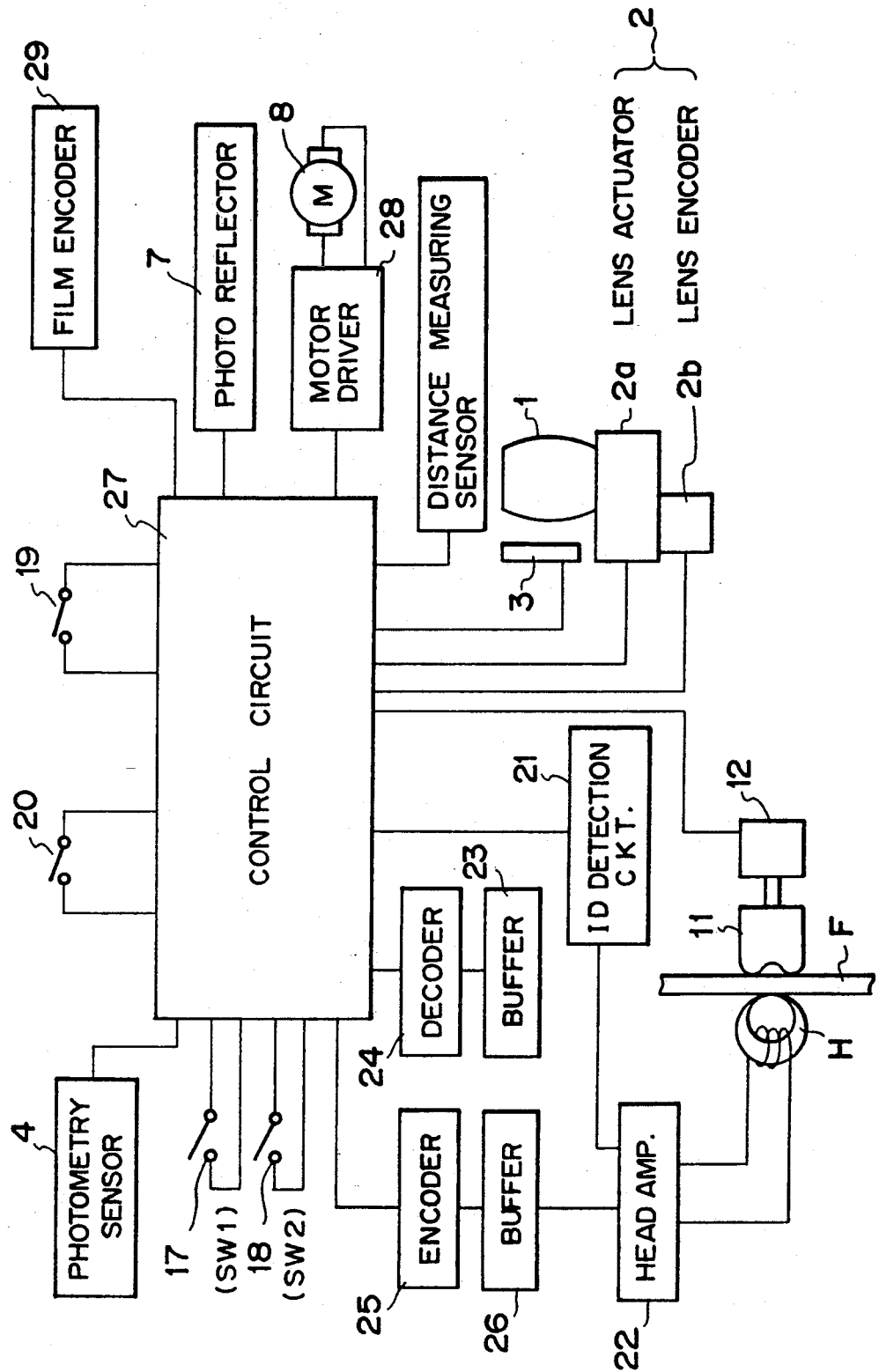
FIG. 9 is a circuit block diagram of the camera shown in FIG. 8.

In this second embodiment, a film encoder 29 is newly provided to more finely detect the feed length during one-frame feeding of film (see FIGS. 8 and 9). This film encoder 29 comprises a roller R rotatably bearing against the film F, a pulse plate P having an equally divided pattern of a transmitting portions and a non-transmitting portions and rotatable with the roller R, and a photointerrupter T for counting the amount of rotation of the pulse plate P.

In the above described construction, when the camera is again loaded with a halfway rewound film cartridge, the feed length of the film F is monitored by the film encoder 29, and the detection of the ID number of the film information TM is effected only within the minimum length CMIN over which the camera information TC of each frame can be written, and the discrimination between an "exposed" frame and an "unexposed" frame is effected.

The minimum length CMIN shown in FIGS. 10A to 10C over which the camera information TC can be written shows the detection area at this time.

FIG. 10A shows an unexposed frame and $O_4$ indicates the output of the ID detection circuit 21 in this case, FIG. 10B shows an exposed frame having the camera information TC written over the maximum length CMAX, and $O_5$ indicates the output of the ID detection circuit 21 in this case, and FIG. 10C shows an exposed frame having the camera information TC written over the minimum length CMIN, and $O_6$ indicates the output of the ID detection circuit 21 in this case.

As can be seen from FIGS. 10B and 10C, no ID sentinels of the film information TM are detected from an "exposed" frame. Accordingly, discrimination can be made as follows:

| | | |
|---|---|---|
| ID number | 0 | "exposed" frame |
| ID number | 1 or more | "unexposed" frame |

An "unexposed" frame, will be detected if any one of six ID sentinels is detected as shown in FIG. 10A.

According to each of the above-described embodiments, design is made such that for an exposed frame, the camera information TC is overwritten on the pre-written film information TM and when the camera is again loaded with a rewound partially exposed film cartridge, whether the film information is written into one frame is detected and therefore, whether the frame being read out is an "exposed" frame or an "unexposed" frame can be discriminated.

Also, in a construction wherein use is made of film in which film information having a plurality of ID numbers for each frame is written and the camera information TC is overwritten on this film information each time photographing is effected, design is made such that whether the frame being read out is an "exposed" frame or an "unexposed" frame is discriminated by whether the ID number in the film information TM is equal to or less than a predetermined number and therefore, even if a reproduction error occurs and a discrimination error comes out, it is limited to discriminating an "unexposed" frame from an "exposed" frame and it never happens that a double exposure occurs, and also use is made of film on which a plurality of ID sentinels (of film information) are written in one frame and thus, even if the reproduction error rate is high as compared with that in the related art, it becomes possible to accomplish more accurate discrimination between an "exposed" frame and an "unexposed" frame. That is, there can be provided a system of very high reliability which permits the use of a reloaded film cartridge in which film has been rewound without having been completely exposed.

What is claimed is:

1. A camera having a processing means for reading information recorded on an information recording medium corresponding to each frame of a film, and for writing information into the information recording medium, said camera comprising:
    (a) a control circuit for substantially erasing a subset of a plurality of data items pre-recorded on the recording medium for each frame, by writing information on the recording medium for each frame with the processing means; and
    (b) a judgment circuit for (i) counting a number of non-erased data items on the recording medium for each frame, (ii) comparing the counted number with a threshold value, the threshold value being less than a number of the plurality of pre-recorded data items, and (iii) judging that the writing of information has not been performed by the processing means when the counted number is greater than or equal to the threshold value.

2. A camera according to claim 1, wherein the number of the plurality of pre-recorded data items for each frame of the film equals N, and wherein a number of pre-recorded data items which are erased during the writing of information equals M, such that N>M.

3. A camera according to claim 2, wherein each of the plurality of pre-recorded data items comprises a plurality of N bits.

4. A camera according to claim 3, wherein the plurality of data items comprises code data.

5. A camera according to claim 2, wherein the processing means performs the writing of information for each frame over a predetermined range which is shorter than a width of each frame.

6. A camera according to claim 5, wherein the processing means performs the reading of information for each frame over a full length of each frame.

7. A camera according to claim 5, wherein the processing means performs the reading of information for each frame over the predetermined range.

8. A camera according to claim 1, wherein the information recording medium comprises a magnetic track, and the processing means comprises a magnetic head portion.

9. A camera according to claim 2, wherein the information recording medium comprises a magnetic track, and the processing means comprises a magnetic head portion.

10. A camera according to claim 8, wherein the writing of information by said magnetic head portion is performed during a feeding of the film for each photographing cycle.

11. A camera according to claim 10, wherein the reading of information by said magnetic head portion is performed during the feeding of the film from a cartridge toward a film take-up spool, and said camera is provided with a prohibition circuit for prohibiting the feeding of the film from the cartridge toward the take-up spool, when the number of non-erased data items counted by said judgment circuit is judged to be less than the threshold value, thereby indicating an exposed frame.

12. A camera having a processing means for reading information recorded on an information recording medium corresponding to each frame of a film, and for writing information into the information recording medium, said camera comprising:
    (a) a control circuit for operating the processing means during a feeding of each frame of the film in each photographing cycle to write a plurality of M information items into the information recording medium, thereby substantially erasing a subset of a plurality of N data items pre-recorded on the information recording medium, such that M is less than N; and
    (b) a judgment circuit for (i) reading non-erased pre-recorded data items for a frame, with the processing means during the feeding of the film without being accompanied by a photographing operation, and (ii) judging that the frame is exposed when a number of non-erased pre-recorded data items read for the frame is less than a threshold value.

13. A camera according to claim 12, wherein each of the plurality of N data items comprises code data including a plurality of bits.

14. A camera according to claim 12, wherein the processing means performs writing of information for each frame over a predetermined range which is shorter than a width of each frame.

15. A camera according to claim 14, wherein the processing means performs the reading of information for each frame over a full length of each frame.

16. A camera according to claim 14, wherein the processing means performs the reading of information for each frame over the predetermined range.

17. A camera according to claim 12, wherein the information recording medium comprises a magnetic track, and the processing means comprises a magnetic head portion.

* * * * *

UNITED STATES PATENT AND TRADEMARK OFFICE
CERTIFICATE OF CORRECTION

PATENT NO. : 5,281,987
DATED : January 25, 1994
INVENTOR(S) : Toru Nagata

It is certified that error appears in the above-identified patent and that said Letters Patent is hereby corrected as shown below:

COLUMN 1:

Line 46, "flag 1" should read --flag--.

Figure 3B:
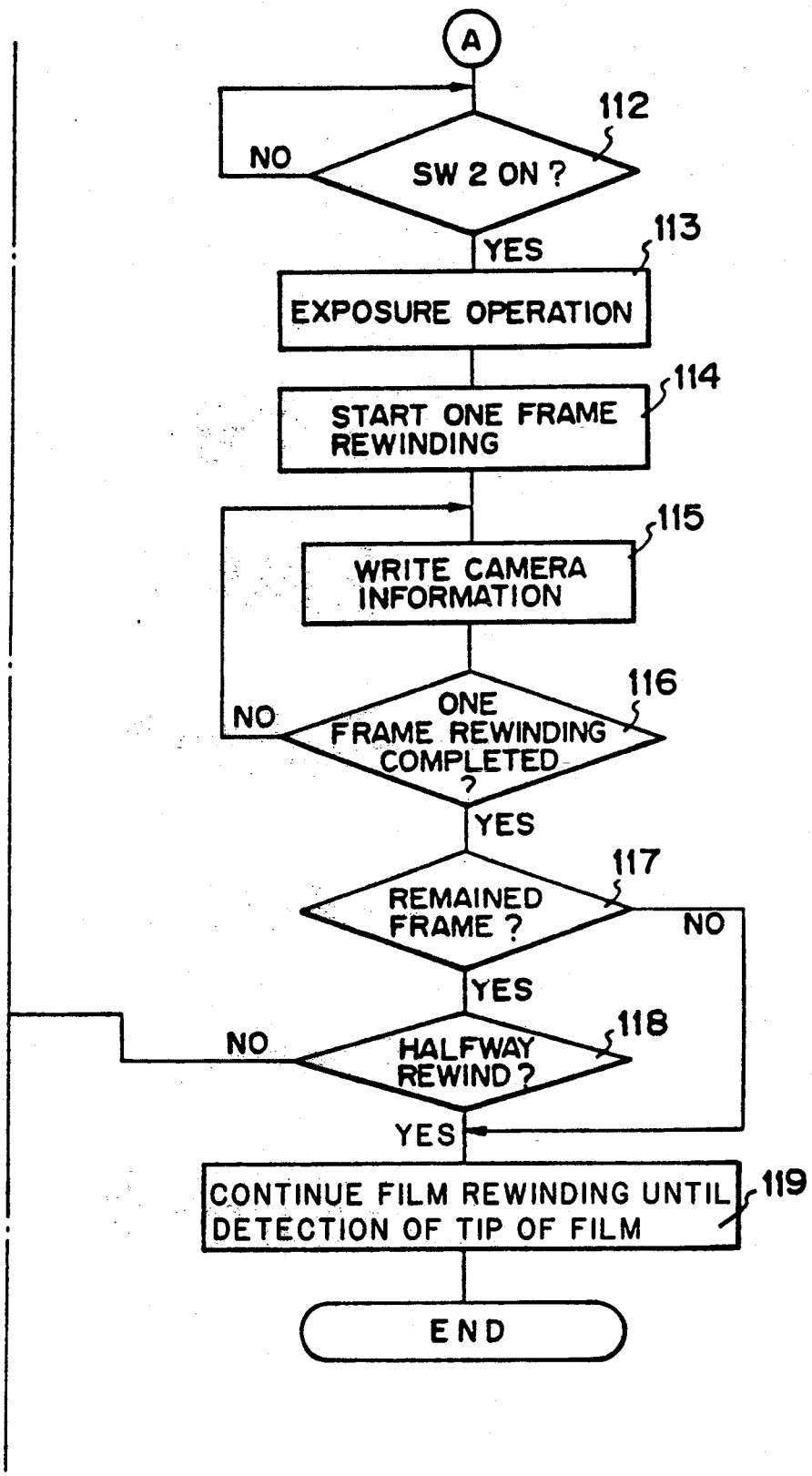
FIG. 3 is a flowchart showing the operation of the control circuit shown in FIG. 2.

COLUMN 2:

Line 31, "film" should read --film is--.
Line 46, "FIG. 3 is" should read --FIGS. 3A and 3B are--.

COLUMN 3:

Line 32, "side" should read --side,--.

Column 5:

Line 58, "to" should be deleted.

Signed and Sealed this

Second Day of August, 1994

Attest:

BRUCE LEHMAN

Attesting Officer          Commissioner of Patents and Trademarks